United States Patent
White et al.

(10) Patent No.: US 7,035,730 B2
(45) Date of Patent: Apr. 25, 2006

(54) METHOD FOR DIAGNOSING CATALYTIC CONVERTER PERFORMANCE

(75) Inventors: Vincent A. White, Northville, MI (US); David N. Belton, Birmingham, MI (US); Randy L. Dufresne, Orchard Lake, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/930,464

(22) Filed: Aug. 31, 2004

(65) Prior Publication Data

US 2006/0047407 A1 Mar. 2, 2006

(51) Int. Cl.
*F01N 11/00* (2006.01)

(52) U.S. Cl. ........................................ 701/114; 60/276

(58) Field of Classification Search .................... None
See application file for complete search history.

(56) References Cited

U.S. PATENT DOCUMENTS 6,418,711 B1 * 7/2002 Surnilla et al. ............... 60/276

* cited by examiner

*Primary Examiner*—Andrew M. Dolinar
(74) *Attorney, Agent, or Firm*—Christopher DeVries

(57) ABSTRACT

A method of generating a metric data set for determining a performance of a catalytic converter includes sampling data from a post catalytic converter oxygen sensor to provide a raw data set and generating a revised data set based on the raw data set. Data within the revised data set is eliminated based on characteristics of data points of the revised data set and the revised data set is filtered to provide the metric data set.

27 Claims, 11 Drawing Sheets

METHOD FOR DIAGNOSING CATALYTIC CONVERTER PERFORMANCE

FIELD OF THE INVENTION

The present invention relates to diagnostic systems for vehicles, and more particularly to a method for diagnosing catalytic converter efficiency.

BACKGROUND OF THE INVENTION

During the combustion process, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds. Automobile exhaust systems include a catalytic converter that reduces the levels of CO, HC, and NOx in the exhaust gas by chemically converting these gasses into carbon dioxide, nitrogen, and water. Diagnostic regulations require periodic monitoring of the catalytic converter for proper conversion capability.

Typical monitoring methods employ two exhaust gas oxygen sensors and infer the conversion capability of the catalytic converter using the sensor signals. One sensor monitors the oxygen level associated with an inlet exhaust stream of the catalytic converter. This inlet $O_2$ sensor is also the primary feedback mechanism that maintains the fuel-to-air (F/A) ratio of the engine at the chemically correct, or stoichiometric F/A ratio needed to support the catalytic conversion processes. A second or outlet $O_2$ sensor monitors the oxygen level concentration of the exhaust stream exiting the catalytic converter.

Traditional monitoring methods relate the empirical relationships that exist between the inlet and outlet $O_2$ sensor to quantify catalyst conversion capability. These methods compare sensor amplitude, response time, response rate, and/or frequency content data. All of these measurements are affected by a property of a catalytic converter known as Oxygen Storage Capacity (OSC). OSC refers to the ability of a catalytic converter to store excess oxygen under lean conditions and to release oxygen under rich conditions. The amount of oxygen storage and release decreases as the conversion capability of the catalytic converter is reduced. Therefore, the loss in OSC is related to the loss in conversion capability.

Traditional methods for diagnosing catalytic converter performance based on OSC are intrusive. More specifically, traditional diagnostic methods manipulate the F/A ratio and monitor the resultant sensor signal.

SUMMARY OF THE INVENTION

Accordingly, the present invention provides a method of generating a metric data set for determining the performance of a catalytic converter. The method includes sampling data from a post catalytic converter oxygen sensor to provide a raw data set and generating a revised data set based on the raw data set. Data within the revised data set is eliminated based on characteristics of data points of the revised data set and the revised data set is filtered to provide the metric data set.

In one feature, the step of generating the revised data set includes taking a derivative of data within the raw data set.

In another feature, the step of eliminating data within the revised data set based on characteristics of data points of the revised data set includes eliminating a data point based on values of subsequent data points.

In another feature, the step of eliminating data within the revised data set based on characteristics of data points of the revised data set includes eliminating a data point if said data point is greater than a maximum value.

In another feature, the step of eliminating data within the revised data set based on characteristics of data points of the revised data set includes eliminating a data point if the data point is negative.

In still other features, the method further includes eliminating data within the revised data set based on air flow data corresponding to the revised data set. The step of eliminating data within the revised data set based on air flow data corresponding to the revised data set includes eliminating data points that correspond to transient air flow. Alternatively, the step of eliminating data within the revised data set based on air flow data corresponding to the revised data set includes eliminating data points that correspond to air flows that exceed a maximum air flow value.

In yet another feature, the step of filtering includes filtering the revised data set with a first order filter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
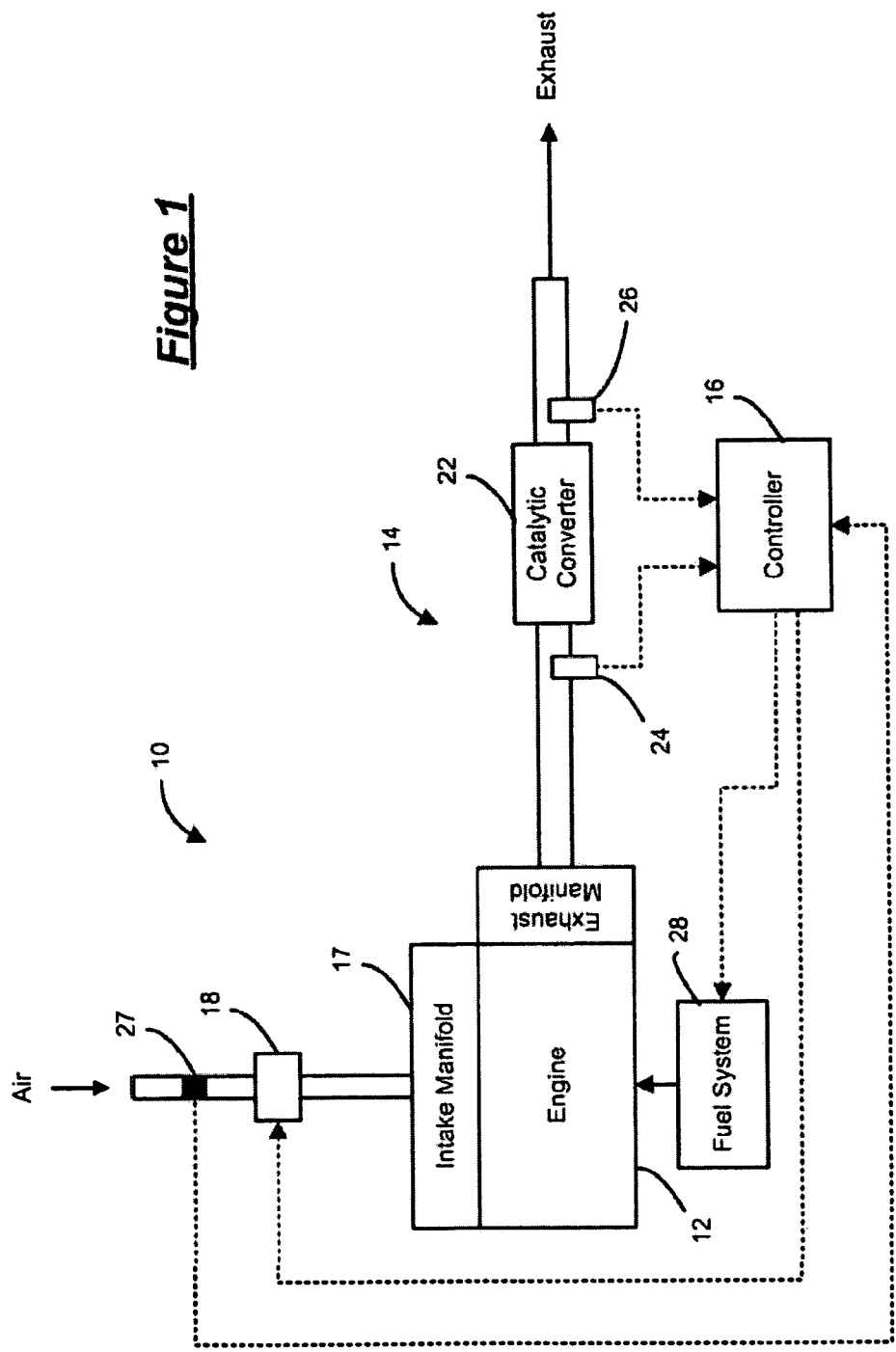
FIG. 1 is a functional block diagram of a vehicle including a controller that performs a catalytic converter performance diagnostic according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, an exemplary vehicle 10 includes an engine 12, an exhaust system 14 and a control module 16. The engine 12 includes an intake manifold 17 and a throttle 18. Air is drawn into the intake manifold 17 through the throttle 18 and is combusted within the engine 12 to produce drive torque. The combustion process also produces exhaust. The exhaust system 14 includes a catalytic converter 22, a pre-catalyst or inlet oxygen sensor 24, and a post-catalyst or outlet oxygen sensor 26. The inlet and outlet oxygen sensors 24, 26 communicate with the control module 16 to provide inlet and outlet F/A ratio signals, respectfully. A mass air flow (MAF) sensor 27 communicates with the control module 16 to provide a MAF signal. The control module 16 communicates with a fuel system 28 to regulate fuel flow to the engine 12. In this manner, the control module 16 regulates the F/A ratio of the engine 12.

The control module 16 processes the outlet oxygen sensor signal to determine catalytic converter performance according to the diagnostic of the present invention. More specifically, the control module 16 converts outlet oxygen sensor signal data into a unit-less metric or figure of merit that is used to indicate the oxygen storage capacity (OSC) of the catalytic converter 22. The outlet oxygen sensor data can be collected upon initiating the catalytic converter performance diagnostic. Alternatively, the outlet oxygen sensor data can be continuously stored in a memory buffer and the catalytic converter performance diagnostic can be processed based on the historical data. As the OSC of the catalytic converter decreases, the figure of merit of the present invention correspondingly increases, as explained in further detail below. Therefore, the figure of merit can be compared to a threshold level that corresponds to an under-performing catalytic converter.

Figure 2:
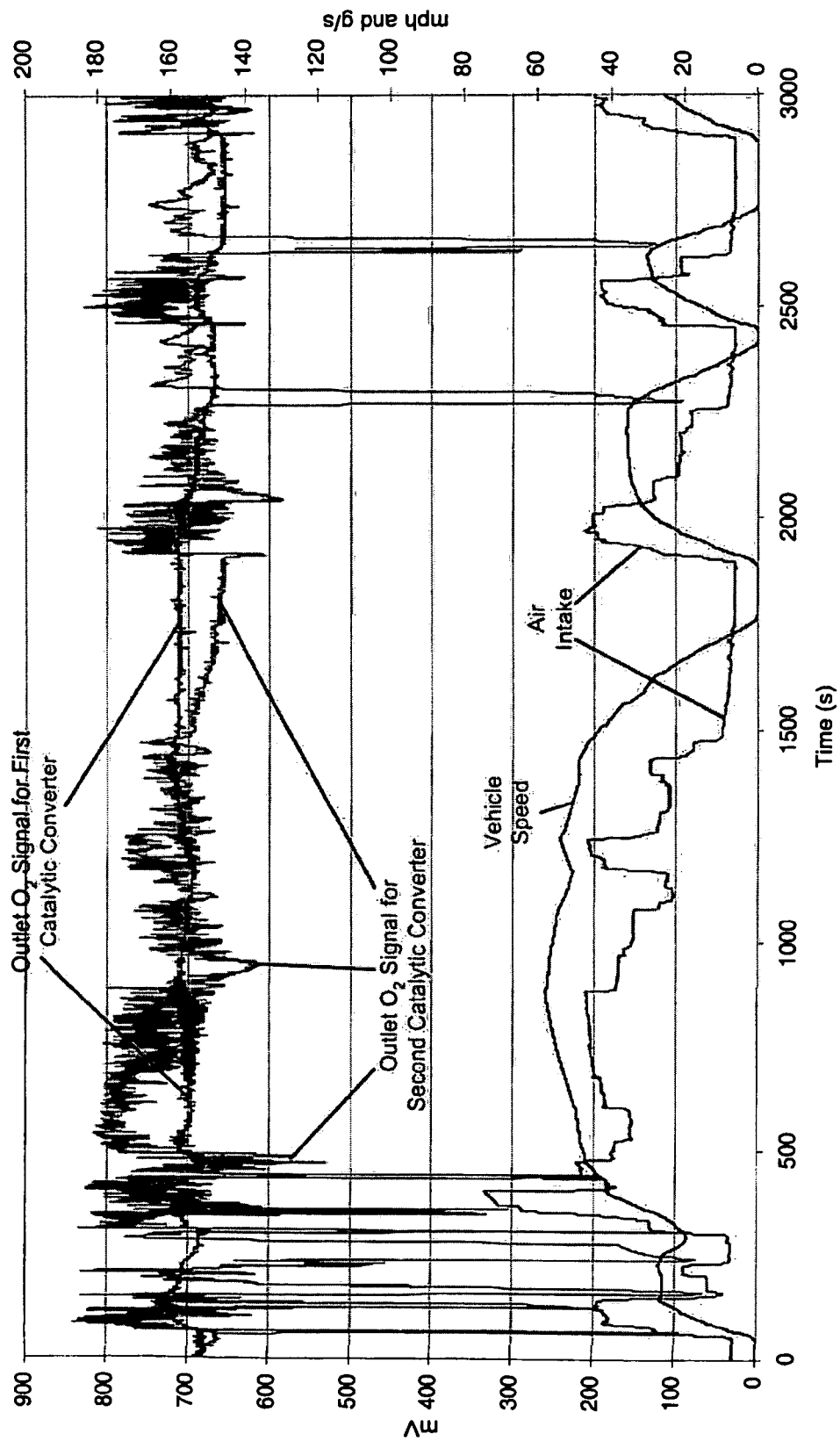
FIG. 2 is a graph illustrating exemplary outlet oxygen sensor signals associated with first and second exemplary catalytic converters.

Referring now to FIGS. 2 through 10, conversion of outlet oxygen sensor signal data for two exemplary catalytic converters into respective figures of merit will be described in detail. The first exemplary catalytic converter has experienced less drive cycles (i.e., is younger) than the second exemplary catalytic converter. FIG. 2 is a graph illustrating the outlet oxygen sensor data for the exemplary catalytic converters, vehicle speed data and air flow data over a plurality of exemplary drive cycles. As illustrated, the signal data of the second exemplary catalytic converter is more erratic than the signal data of the first exemplary catalytic converter.

Figure 3:
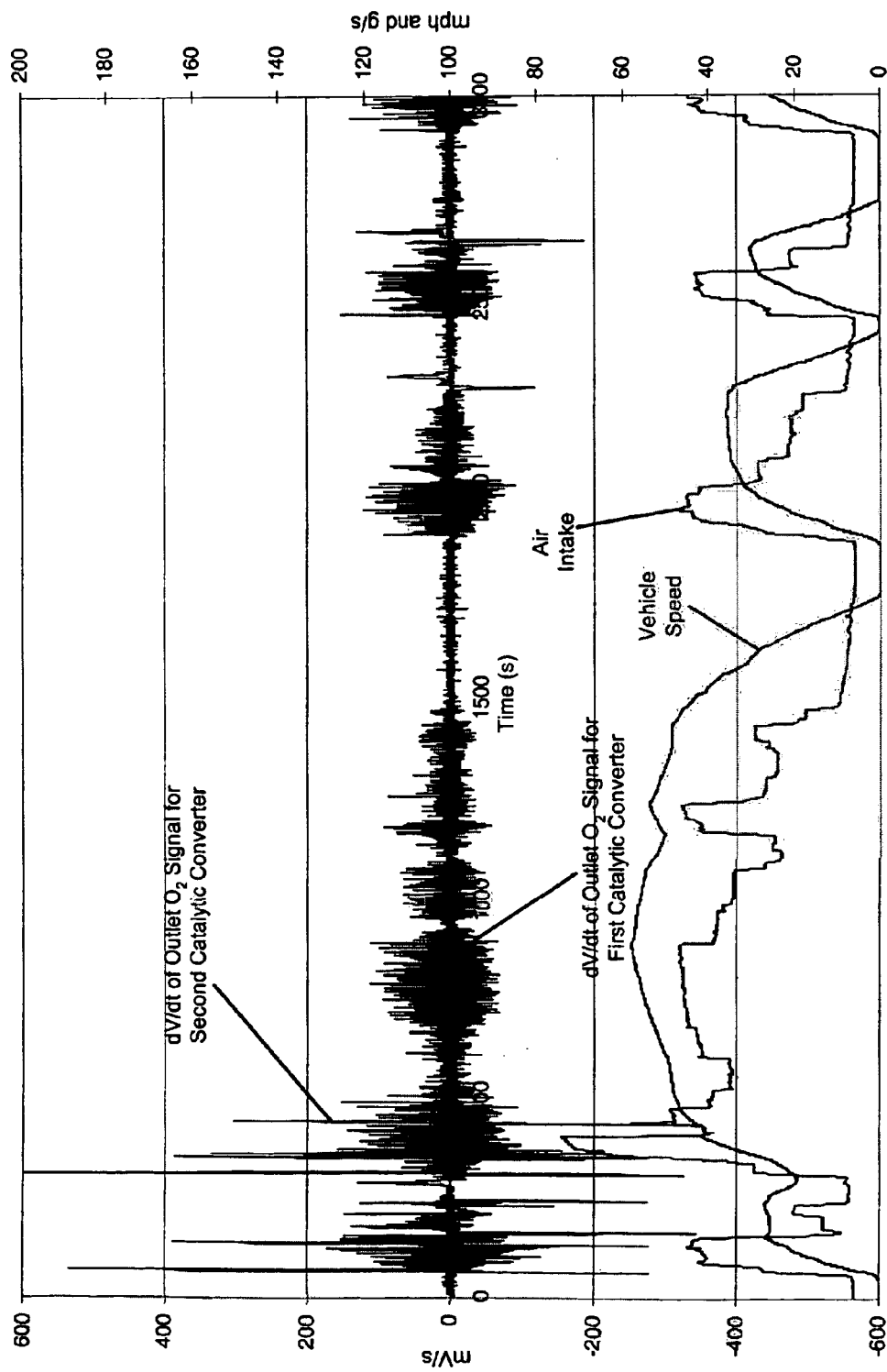
FIG. 3 is a graph illustrating first derivative data of the exemplary outlet oxygen sensor signals.

Referring now to FIG. 3, the first derivative of the signal data of the exemplary catalytic converters taken. The first derivative of the signal data corresponds to the rate of change of the signal data. The first derivative of the signal data for both exemplary catalytic converters is illustrated in FIG. 3 over the corresponding vehicle speed and air flow data for the exemplary drive cycles. Because the signal data of the second exemplary catalytic converter is more erratic than that of the first catalytic converter, the first derivative of the signal data of the second exemplary catalytic converter is greater than that of the first catalytic converter in both the positive and negative directions.

Figure 4:
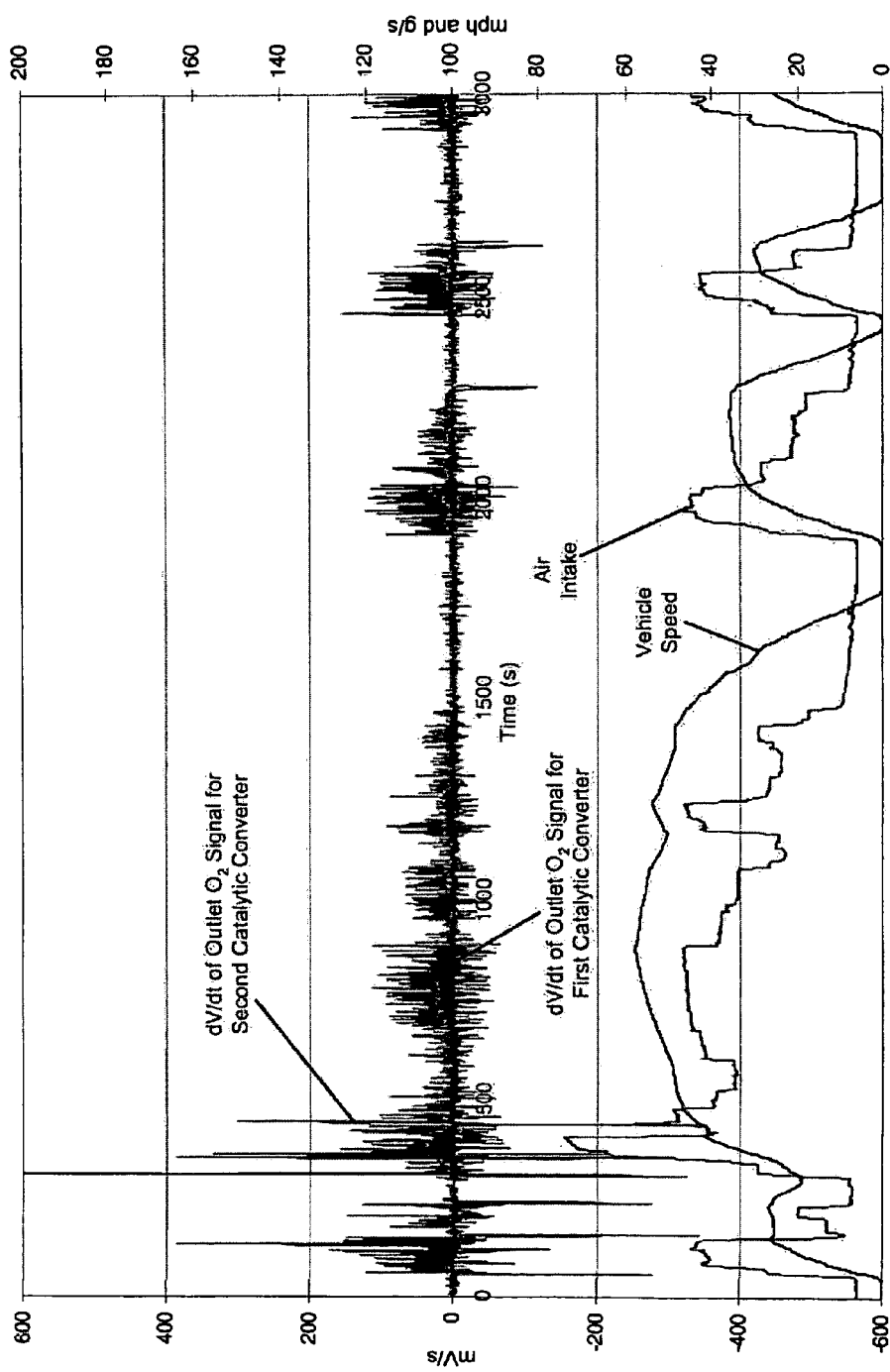
FIG. 4 is a graph illustrating reduced first derivative data based on sample analysis according to the present invention.

Referring now to FIG. 4, a slope analysis is performed to remove undesired portions of the first derivative data. More specifically, the slope analysis removes first derivative data that continuously slopes in one direction over a relatively long period of time (i.e., low frequency portions of the first derivative data). The slope analysis compares the sum of n data points to the sum of n+1 data points. If the sum of the n data points is greater than the sum of the n+1 data points, then data points 1 through n define a low frequency portion of the first derivative data. In this case, data point 1 is deleted and slope analysis continues until each of the data points has been correspondingly analyzed.

Figure 5:
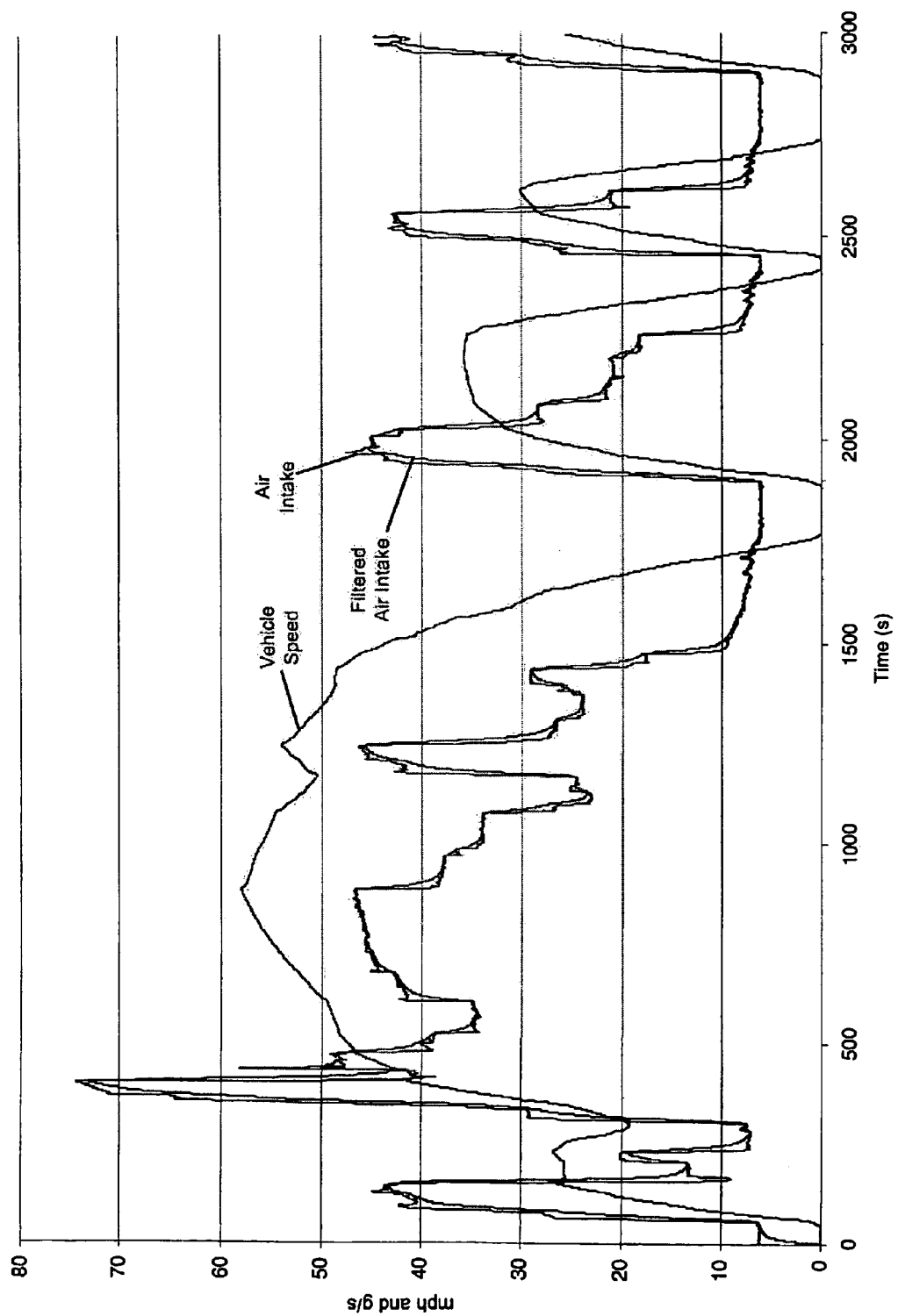
FIG. 5 is a graph illustrating air flow data and filtered air flow data that corresponds to the first derivative data of the exemplary outlet oxygen sensor signals.
Figure 6:
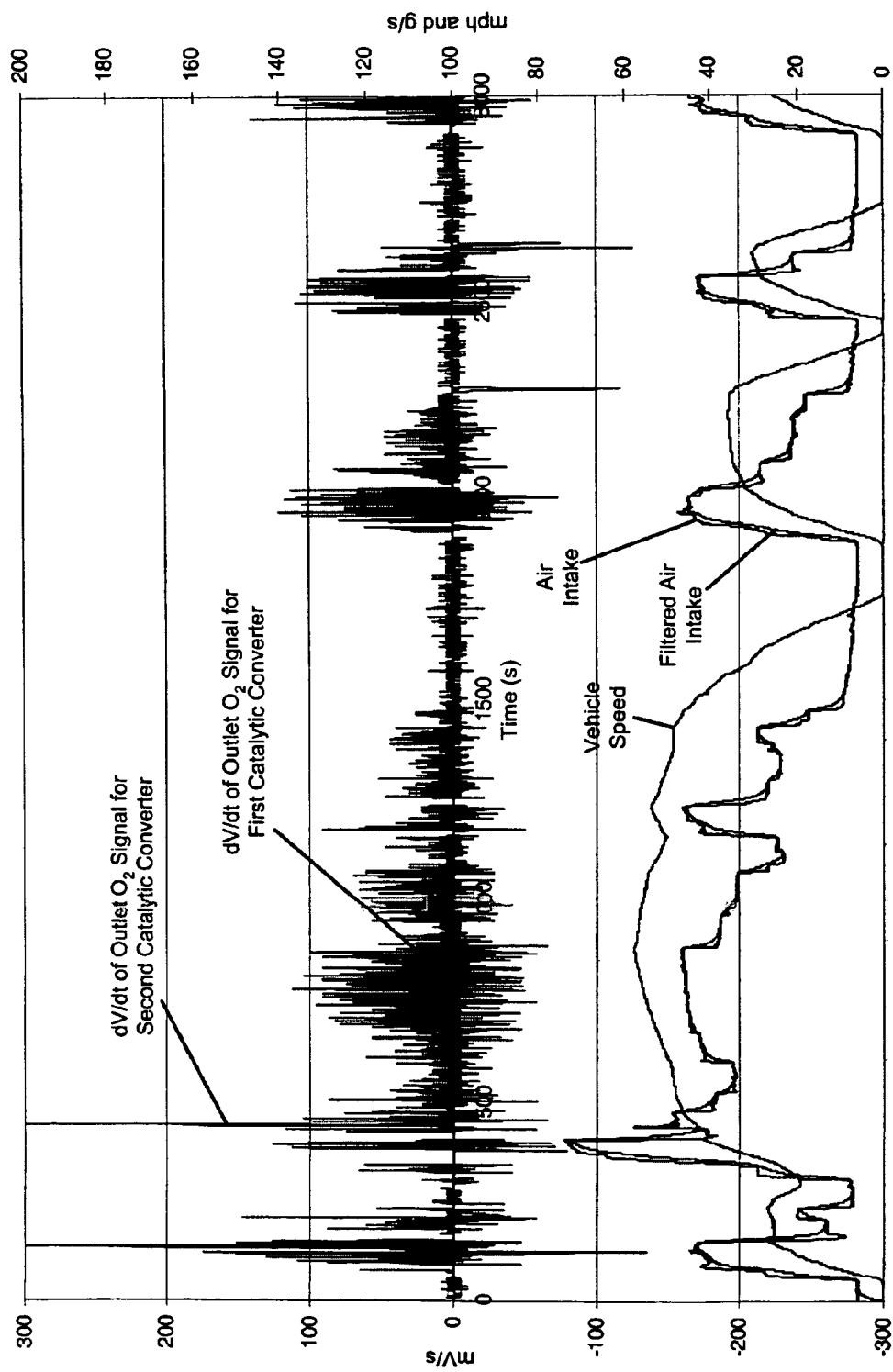
FIG. 6 is a graph illustrating reduced first derivative data based on transient air flow analysis according to the present invention.

Referring now to FIGS. 5 and 6, the first derivative data for each of the exemplary catalytic converters is further reduced based on a delta air flow analysis. More specifically, the air flow data is analyzed to determine periods transient air flow. FIG. 5 provides a more detailed illustration of the air flow data for the exemplary drive cycles. The graph of FIG. 5 also includes filtered air flow data that is generated using a first order filter. As can be seen, the filtered air flow data lags the non-filtered air flow data when the air flow data changes or is transient.

The delta air flow analysis determines the difference between each non-filtered air flow data point and the corresponding filtered air flow data point. If the difference exceeds a threshold value, the particular air flow data point is deemed transient and the corresponding first derivative data points for each of the exemplary catalytic converters is removed. If the difference does not exceeds the threshold value, the particular air flow data point is not deemed transient and the corresponding first derivative data points for each of the exemplary catalytic converters remain. FIG. 6 illustrates the first derivative data remaining after the delta air flow analysis has been performed for the exemplary drive cycles.

Figure 7:
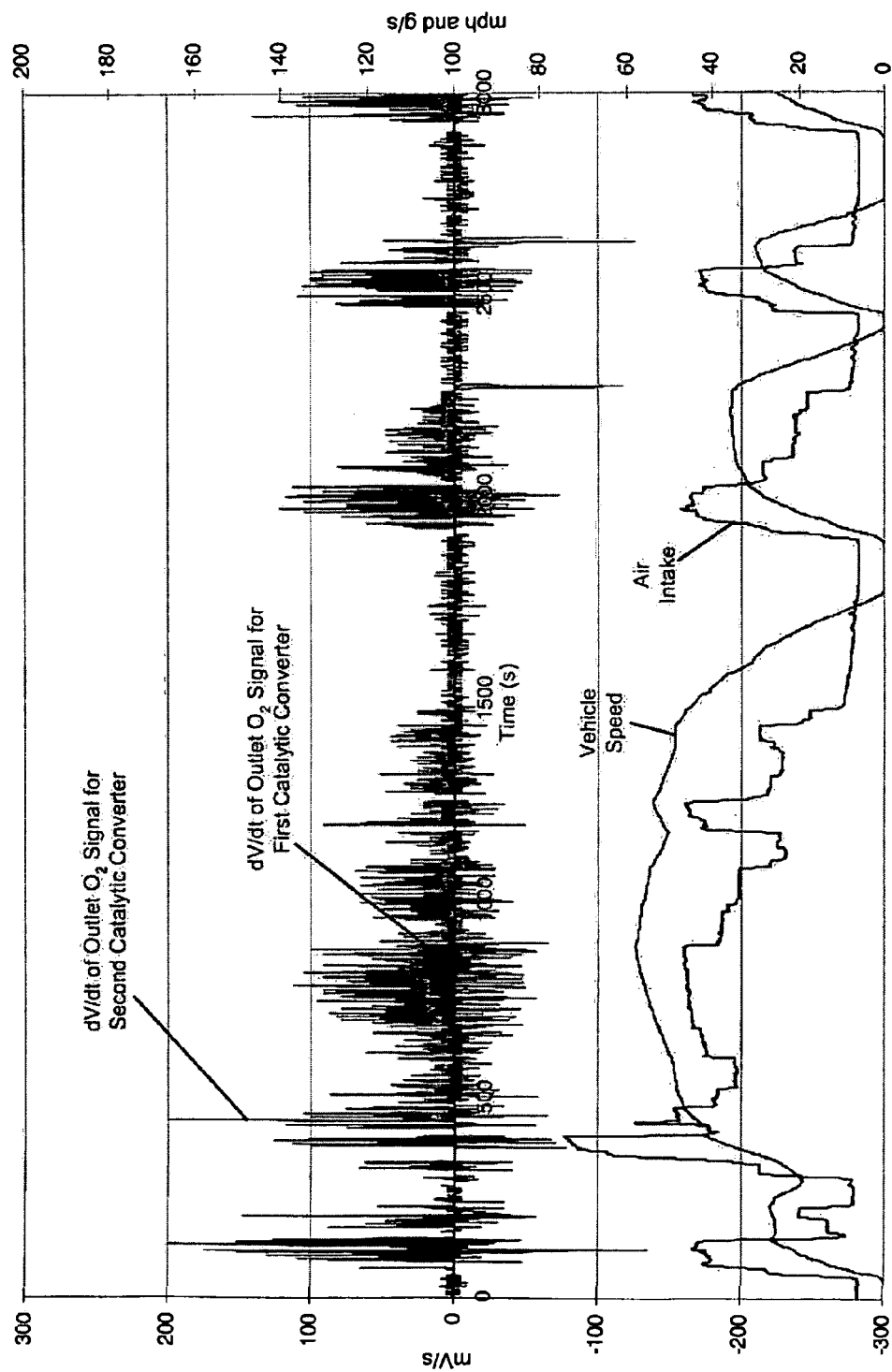
FIG. 7 is a graph illustrating limited first derivative data based on maximum positive and negative values according to the present invention.
Figure 8:
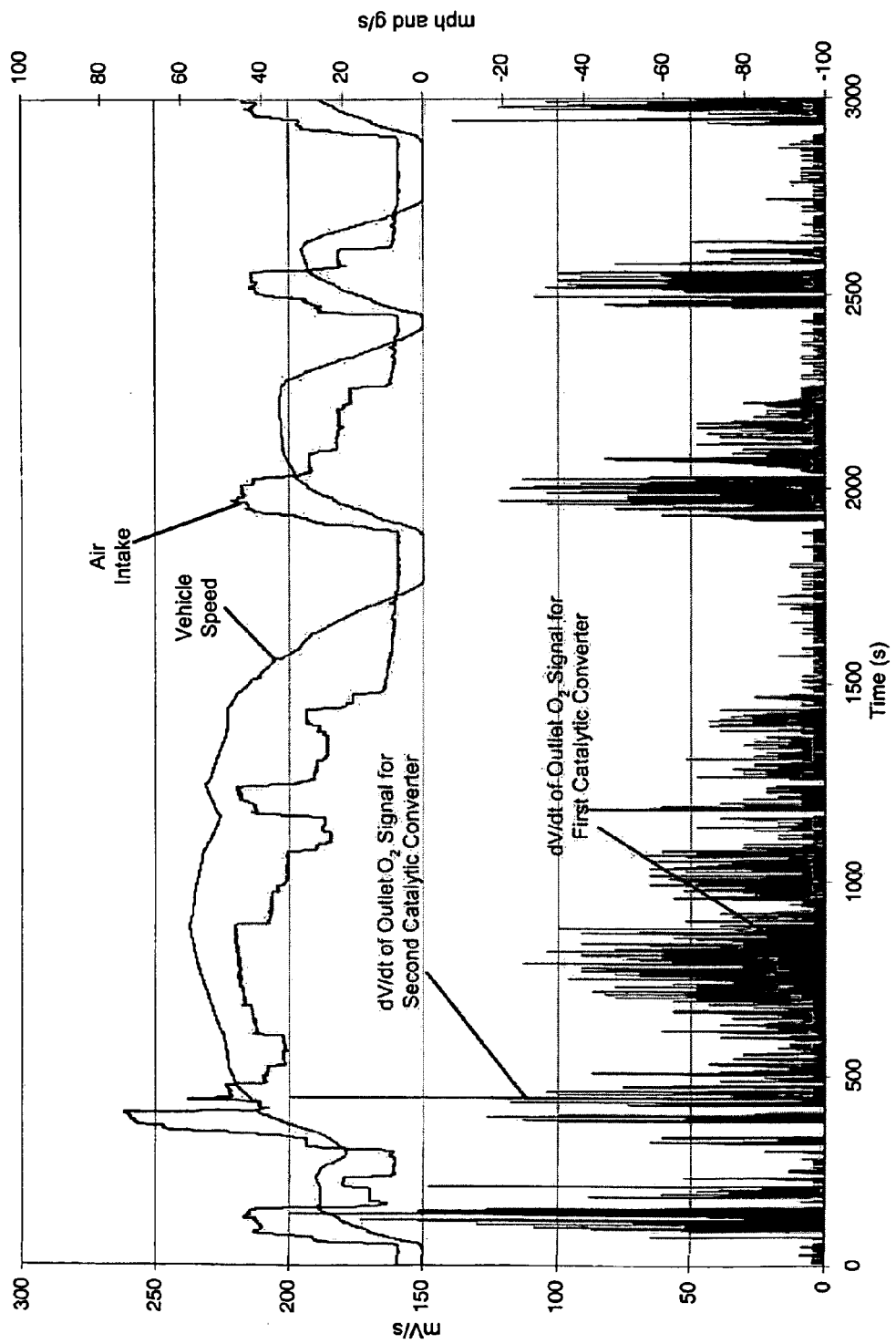
FIG. 8 is a graph illustrating positive first derivative data of the exemplary oxygen sensor signals.

Referring now to FIGS. 7 and 8, the first derivative data is limited by maximum values and negative values of the first derivative data are removed, respectively. More specifically, the first derivative data is limited in both the positive and negative directions by maximum values (e.g., 200 mV/s and −200 mV/s) (see FIG. 7). The negative values of the first derivative data are deleted (see FIG. 8).

Figure 9:
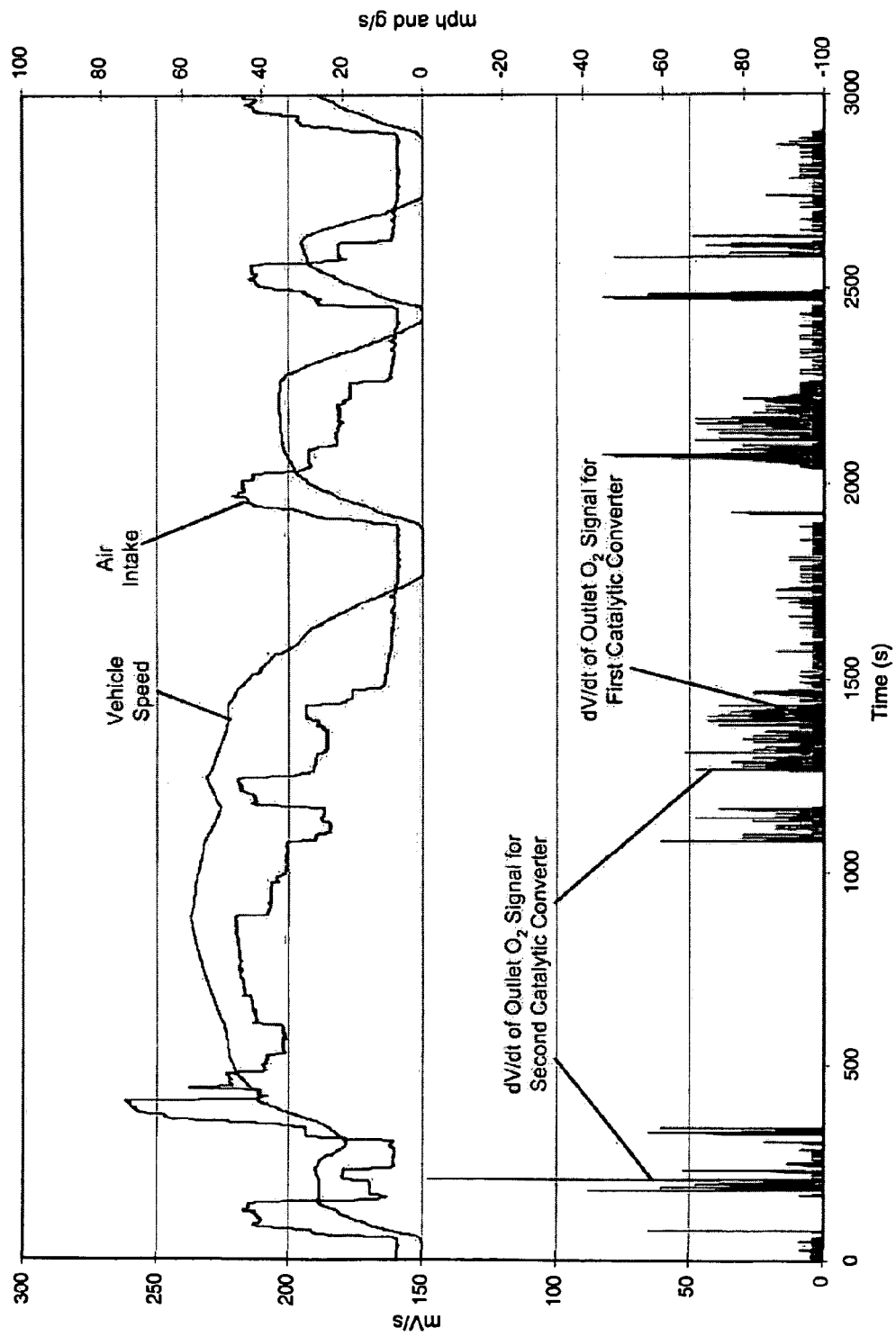
FIG. 9 is a graph illustrating reduced first derivative data based on corresponding high air flows according to the present invention.

Referring now to FIG. 9, the first derivative data is further reduced based on a maximum air flow analysis to eliminate high air flow affects. More specifically, each air flow data point is compared to a threshold value (e.g., 30 g/s). If an air flow data point exceeds the threshold value, the corresponding first derivative data is removed. If the air flow data point exceeds the threshold value, the corresponding first derivative data remains. FIG. 9 illustrates the remaining first derivative data after the maximum air flow analysis has been performed.

Figure 10:
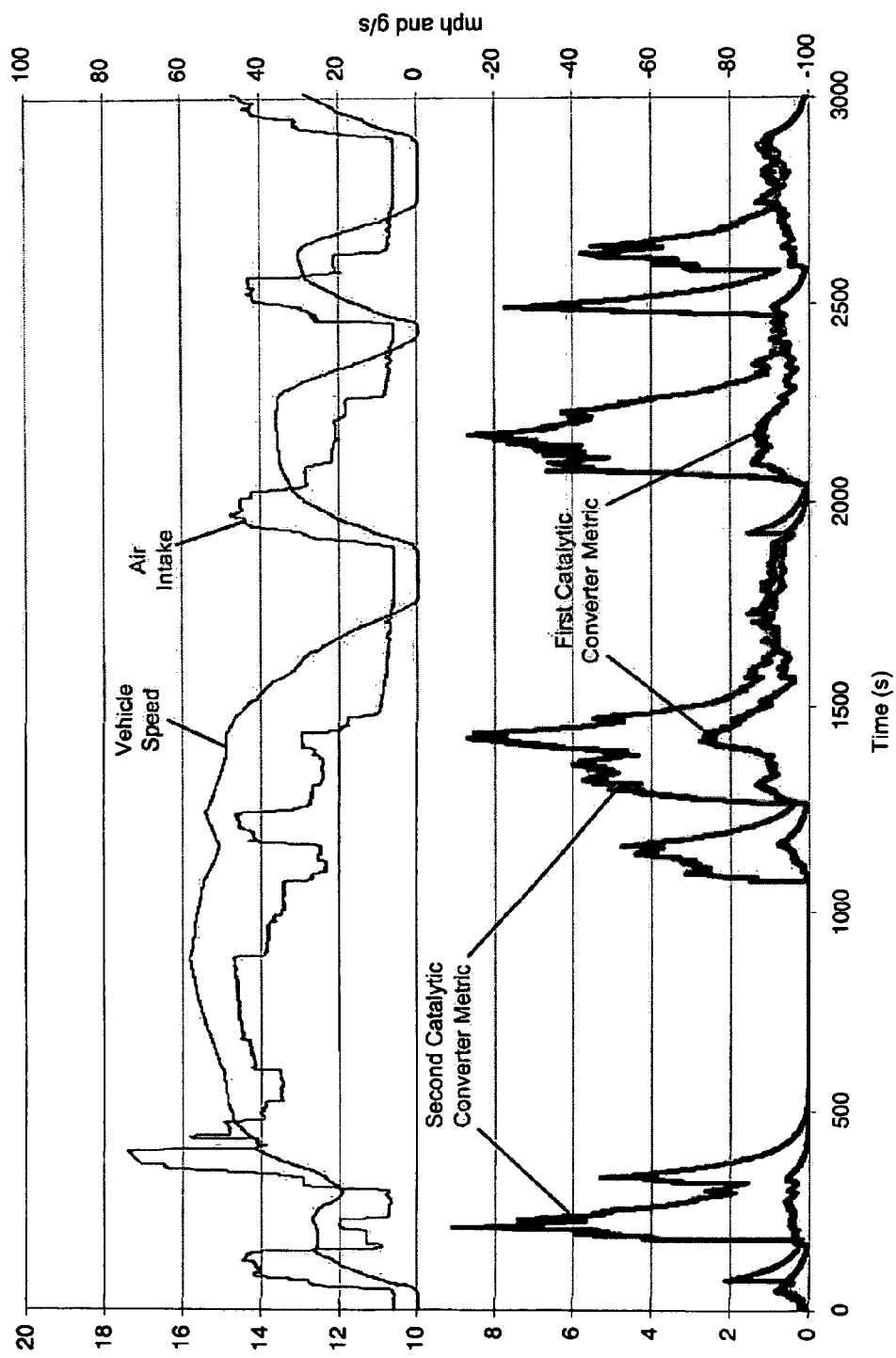
FIG. 10 is a graph illustrating filtered first derivative data that defines an OSC metric according to the present invention.

Referring now to FIG. 10, figure of merit data is provided by filtering the remaining first derivative data points using a first order filter. In this manner, a figure of merit data point is generated for each of the remaining first derivative data points. The figure of merit data set can be regarded as an OSC metric data set. More specifically, the figure of merit data set indicates the OSC of the catalytic converters. For example, the OSC metric data set of the first exemplary catalytic converter has lower values than that of the OSC metric data set of the second exemplary catalytic converter.

The OSC metric data set of each catalytic converter can be compared to a threshold to determine whether the OSC of the particular catalytic converter is insufficient and the catalytic converter needs to be replace. The threshold can be constructed in various manners. In one manner, the average value of the OSC metric data points can be determined over a predefined period of time. If the average metric value exceeds a threshold value, the OSC of the catalytic converter is deemed insufficient. In another manner, a threshold level is provided. If the OSC metric data exceeds the threshold level a threshold number of times, the OSC of the catalytic converter is deemed insufficient.

Figure 11:
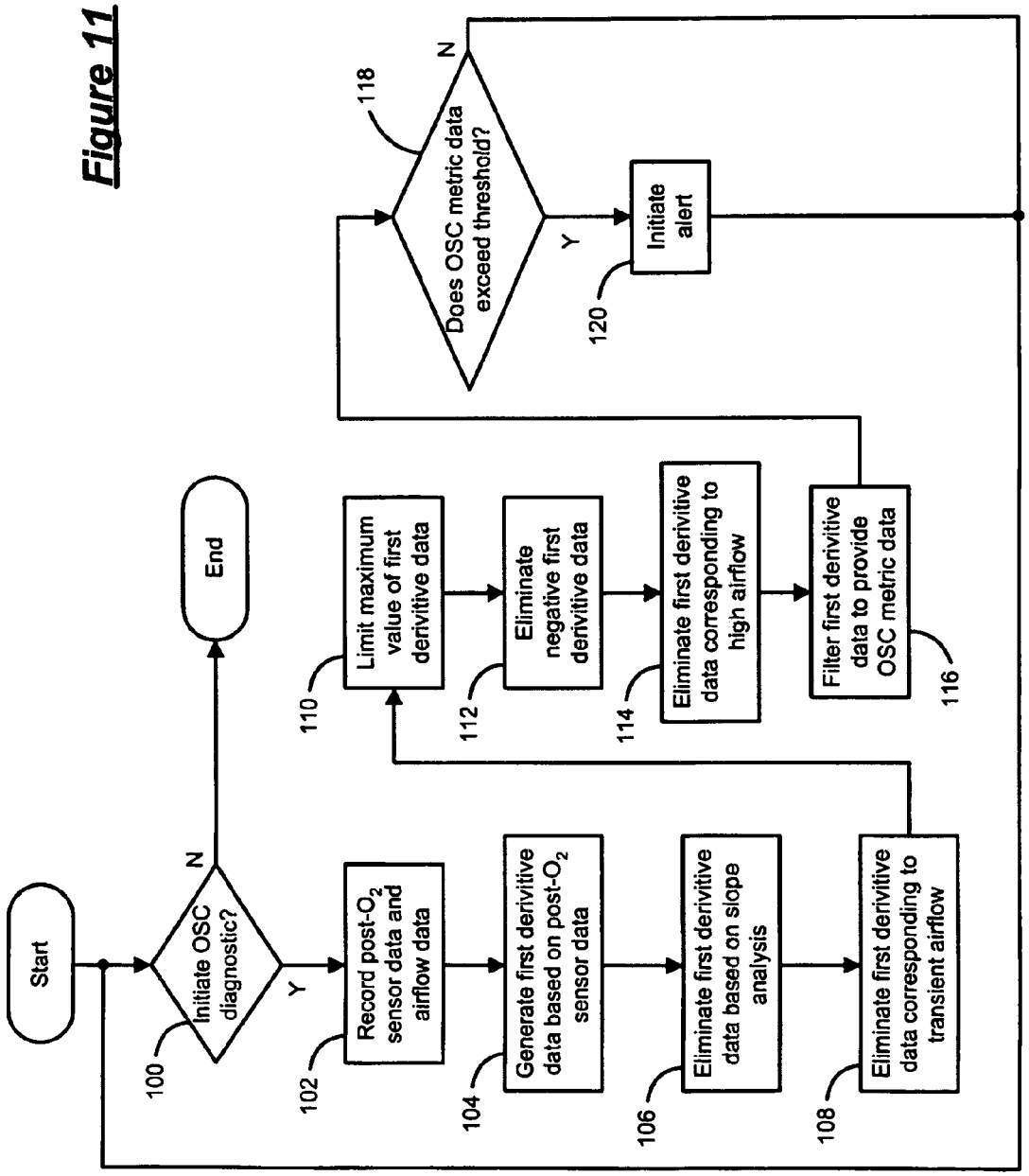
FIG. 11 is a flowchart detailing steps of the catalytic converter performance diagnostic according to the present invention.

Referring now to FIG. 11, the steps performed by the catalytic converter performance diagnostic are summarized. In step 100, control determines whether the diagnostic is to be initiated. The diagnostic is preferably initiated after the engine has been running for a period of time and the catalytic converter has been warmed to a desired operating temperature. The diagnostic can be initiated at any time during engine operation. If the diagnostic is to be initiated, control continues in step 102. If the diagnostic is not to be initiated, control ends.

In step 102, control records outlet oxygen sensor data and air flow data. The data is recorded for a predetermined period of time to provide a outlet oxygen sensor signal data set and a corresponding air flow data set. In step 104, control generates a first derivative data set by taking the first derivative of the outlet oxygen sensor signal data. Control eliminates select data points from the first derivative data set based on the slope analysis in step 106.

In step 108, control eliminates select data points from the first derivative data set based on the transient air flow analysis. Control limits the maximum value of the first derivative data set in step 110. In step 112, control eliminates all of the negative data points from the first derivative data set. Control eliminates the first derivative data points that correspond to high air flow in step 114. In step 116, control filters the remaining first derivative data to provide an OSC metric data set. In step 118, control determines whether the OSC metric data set exceeds the threshold. If the OSC metric data set does not exceed the threshold, control loops to step 100. If the OSC metric data set does exceed the threshold, control initiates an alert in step 120 and loops to step 100.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of generating a metric data set for determining a performance of a catalytic converter, comprising:
    sampling data from a post catalytic converter oxygen sensor to provide a raw data set;
    generating a revised data set based on said raw data set;
    eliminating data within said revised data set based on characteristics of data points of said revised data set; and
    filtering said revised data set to provide said metric data set.

2. The method of claim 1 wherein said step of generating said revised data set includes taking a derivative of data within said raw data set.

3. The method of claim 1 wherein said step of eliminating data within said revised data set based on characteristics of data points of said revised data set includes eliminating a data point based on values of subsequent data points.

4. The method of claim 1 wherein said step of eliminating data within said revised data set based on characteristics of data points of said revised data set includes eliminating a data point if said data point is greater than a maximum value.

5. The method of claim 1 wherein said step of eliminating data within said revised data set based on characteristics of data points of said revised data set includes eliminating a data point if said data point is negative.

6. The method of claim 1, further comprising eliminating data within said revised data set based on air flow data corresponding to said revised data set.

7. The method of claim 6 wherein said step of eliminating data within said revised data set based on air flow data corresponding to said revised data set includes eliminating data points that correspond to transient air flow.

8. The method of claim 6 wherein said step of eliminating data within said revised data set based on air flow data corresponding to said revised data set includes eliminating data points that correspond to air flows that exceed a maximum air flow value.

9. The method of claim 1 wherein said step of filtering includes filtering said revised data set with a first order filter.

10. A method of evaluating a performance of a catalytic converter, comprising:
    sampling data from a post catalytic converter oxygen sensor to provide a raw data set;
    generating an oxygen storage capacity (OSC) metric data set based on said raw data set wherein said generating includes:
        generating a revised data set based on said raw data set;
        eliminating data within said revised data set based on characteristics of data points of said revised data set; and
        filtering said revised data set to provide said metric data set; and
    comparing a characteristic of said OSC metric data set to a threshold value to evaluate said performance.

11. The method of claim 10 wherein said step of generating said revised data set includes taking a derivative of data within said raw data set.

12. The method of claim 10 wherein said step of eliminating data within said revised data set based on characteristics of data points of said revised data set includes eliminating a data point based on values of subsequent data points.

13. The method of claim 10 wherein said step of eliminating data within said revised data set based on characteristics of data points of said revised data set includes eliminating a data point if said data point is greater than a maximum value.

14. The method of claim 10 wherein said step of eliminating data within said revised data set based on characteristics of data points of said revised data set includes eliminating a data point if said data point is negative.

15. The method of claim 10 further comprising eliminating data within said revised data set based on air flow data corresponding to said revised data set.

16. The method of claim 15 wherein said step of eliminating data within said revised data set based on air flow data corresponding to said revised data set includes eliminating data points that correspond to transient air flow.

17. The method of claim 15 wherein said step of eliminating data within said revised data set based on air flow data corresponding to said revised data set includes eliminating data points that correspond to air flows that exceed a maximum air flow value.

18. The method of claim 10 wherein said step of filtering includes filtering said revised data set with a first order filter.

19. A performance monitoring system for a catalytic converter of a vehicle, comprising:
   an oxygen sensor that is downstream of said catalytic converter and that generates a signal based on an oxygen content of exhaust from said catalytic converter; and
   a control module that generates a raw data set based on said signal, that generates a revised data set based on said raw data set, that eliminates data within said revised data set based on characteristics of data points of said revised data set and that filters said revised data set to provide a metric data set.

20. The performance monitoring system of claim 19 wherein said control module generates said revised data set by taking a derivative of data within said raw data set.

21. The performance monitoring system of claim 19 wherein said control module eliminates data within said revised data set by eliminating a data point based on values of subsequent data points.

22. The performance monitoring system of claim 19 wherein said control module eliminates data within said revised data set by eliminating a data point if said data point is greater than a maximum value.

23. The performance monitoring system of claim 19 wherein said control module eliminates data within said revised data set by eliminating a data point if said data point is negative.

24. The performance monitoring system of claim 19, further comprising an air flow sensor that generates an air flow data set, which corresponds to said revised data set, wherein said control module eliminates data within said revised data set based on said air flow data set.

25. The performance monitoring system of claim 24 wherein said control module eliminates data within said revised data set based on air flow data points that correspond to transient air flow.

26. The performance monitoring system of claim 24 wherein said control module eliminates data within said revised data set based on air flow data points that correspond to air flows that exceed a maximum air flow value.

27. The performance monitoring system of claim 19 wherein said control module filters said revised data set using a first order filter.

* * * * *